US007597918B2

(12) United States Patent
Rijnbeek et al.

(10) Patent No.: US 7,597,918 B2
(45) Date of Patent: Oct. 6, 2009

(54) METHOD OF VACUUM PACKAGING PRE-COOKED WHOLE LOBSTERS AND THE PACKAGES MADE THEREWITH

(76) Inventors: Hein Rijnbeek, 79 Spruce Court, Three Fathom Harbour, Halifax County, Nova Scotia (CA) B0J 1N0; Fred Murphy, P.O. Box 199, 934 East Mill River Road, Alberton, Prince Edward Island (CA) C0B 2B0

( * ) Notice: Subject to any disclaimer, the term of this patent is extended or adjusted under 35 U.S.C. 154(b) by 823 days.

(21) Appl. No.: 11/103,624

(22) Filed: Apr. 12, 2005

(65) Prior Publication Data
US 2005/0244557 A1 Nov. 3, 2005

Related U.S. Application Data

(60) Provisional application No. 60/566,402, filed on Apr. 30, 2004.

(51) Int. Cl.
*B65D 77/20* (2006.01)
(52) U.S. Cl. .................. 426/396; 426/392; 426/129
(58) Field of Classification Search .............. 426/106, 426/129, 392, 393, 396, 413, 426, 524; 206/486, 206/557; 141/65
See application file for complete search history.

(56) References Cited

U.S. PATENT DOCUMENTS

| 4,230,729 A | | 10/1980 | Hoelzel, Jr. | |
|---|---|---|---|---|
| 4,958,480 A | * | 9/1990 | Warner | ............... 53/433 |
| 5,085,879 A | | 2/1992 | Elbaz | |
| 5,256,434 A | * | 10/1993 | Conway | ............... 426/393 |
| 5,278,376 A | | 1/1994 | Cyr | |
| D345,911 S | | 4/1994 | Elbaz | |
| D368,030 S | | 3/1996 | Elbaz | |
| 5,863,576 A | * | 1/1999 | Guarino | ............... 426/107 |
| 6,712,022 B2 | | 3/2004 | Fullerton, III | |

* cited by examiner

Primary Examiner—Jennifer McNeil
Assistant Examiner—Dominique Womack
(74) Attorney, Agent, or Firm—Palmer C. DeMeo; Mario Theriault

(57) ABSTRACT

In a method for vacuum packaging a pre-cooked lobster, a bulge, and a horn-receiving notch in that bulge are formed of a plastic tray. The lobster is placed in this tray with a wrapping sheet over it. The bulge and the notch are formed so that the horn of the lobster extends substantially tangent with the wrapping sheet and with the surfaces of the notch. Vacuum is applied between the tray and the wrapping sheet to vacuum-pack the lobster into the tray, thereby enclosing the lobster in a sealed package, with the horn extending tangent to the surfaces of the package surrounding the horn.

3 Claims, 4 Drawing Sheets

METHOD OF VACUUM PACKAGING PRE-COOKED WHOLE LOBSTERS AND THE PACKAGES MADE THEREWITH

FIELD OF THE INVENTION

This invention pertains to a method and a package to vacuum-pack a lobster, and more particularly it pertains to a method for vacuum-pack a lobster to prevent the horn of the lobster from puncturing through the package.

BACKGROUND OF THE INVENTION

In the past, vacuum packaging of pre-cooked lobster has been considered practically impossible. The reason for this being that the horn of the lobster punctures through the package and breaks the seal of the package.

As illustrated in FIGS. 1 and 2, the horn of a lobster has a fine point oriented toward the front of the lobster. When packaging a lobster, the claws are generally brought together in the front of the lobster, thereby creating an empty space near the horn. This empty space represents an area where the wrapping material can pull up or down in a vacuum packaging process, thereby bringing the wrapping material against the tip of the horn, and puncturing the wrapping material.

In the past, some packers have tried to grind the horn off. This practice, however, has enjoyed limited success because the connoisseurs pointed out that any injury or a defect on a lobster casts a doubt as to whether the lobster was dead or alive when it was cooked. Therefore, a first requirement in the vacuum packaging of pre-cooked lobsters is that the lobster must be presented in its most natural state.

SUMMARY OF THE INVENTION

In the present invention, there is provided a method for vacuum packaging a pre-cooked lobster such that the wrapping material is not susceptible of being punctured by the horn of the lobster. This method comprises the steps of:
a) using a thermoforming machine and a thermoforming mold having a lobster-like cavity therein and a bulge, and a horn-retaining notch in that bulge, forming a first plastic sheet to cover the bottom surface of the cavity, thereby forming a molded tray;
b) moving the molded tray out of the thermoforming mold and of the thermoforming machine and placing a lobster inside the molded tray, with the horn thereof aligned inside the notch;
c) placing a second plastic sheet over the molded tray and the lobster;
d) moving the covered molded tray inside a vacuum packaging machine and making a vacuum between the two plastic sheets, while holding the plastic sheets about the horn, and the horn in a fixed relationship to each other, with the longitudinal axis of the horn aligned substantially parallel to the plastic sheets, thereby enclosing the lobster in a sealed package, with the horn extending tangent to the plastic sheets;
e) trimming the flanges of the package thus formed, and
f) freezing the packaged lobster prior to delivery to a retail outlet.

This method ensures that the horn of the lobster remains tangent to the surface of the packaging material.

DESCRIPTION OF THE DRAWINGS

In the accompanying drawings.

DETAILED DESCRIPTION OF THE PREFERRED EMBODIMENT

In the present invention, the lobster is held in a tray 22' and the wrapping material is controlled, so to pull both the bottom and the cover sheets 22, 24 at right angle with the longitudinal axis of the horn 25, from above and below the horn so as to enclosed the horn 25 in an alignment which is tangent to the wrapping material. The wrapped lobster can thereby be handled freely without exposing the package to the possibility of puncture.

Figure 1:
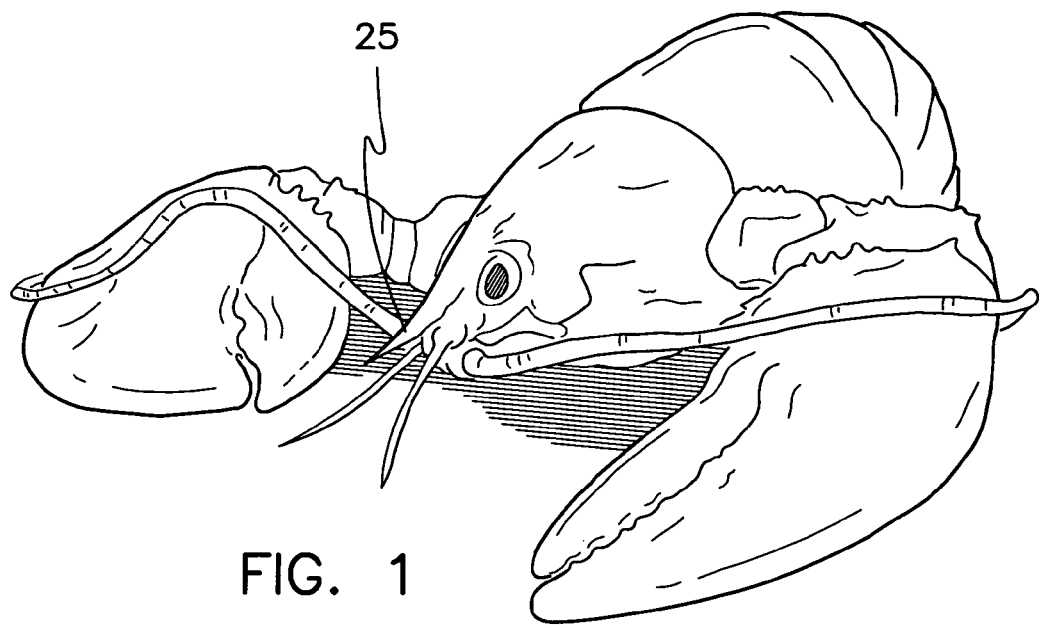
FIGS. 1 and 2 illustrate a side view and a top view respectively of a lobster, pointing out particularly to the horn of the lobster.
Figure 2:
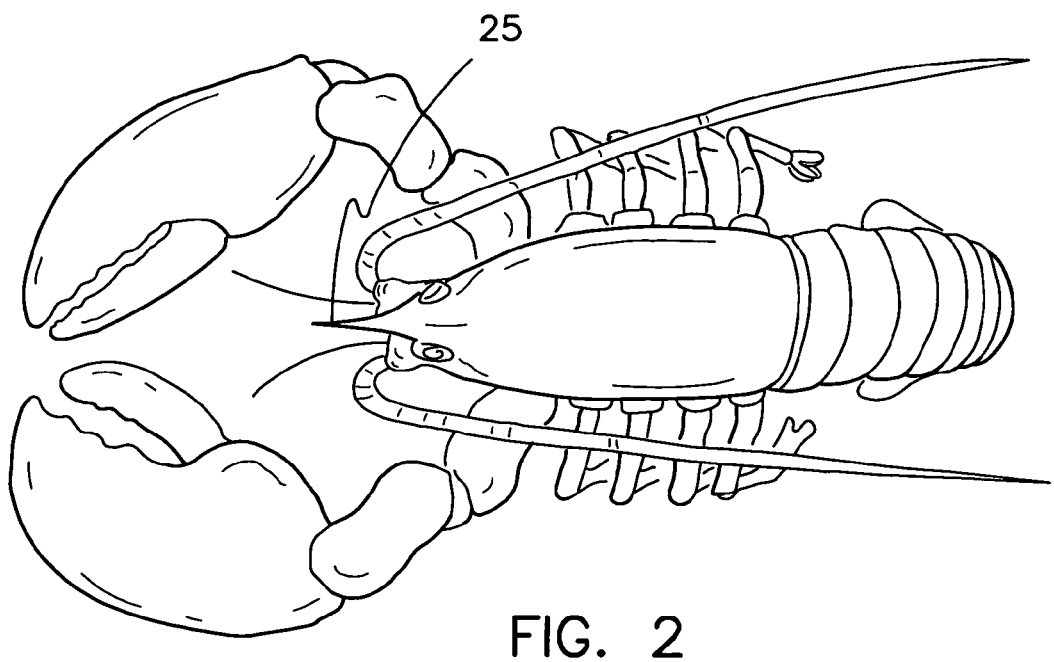
Figure 3:
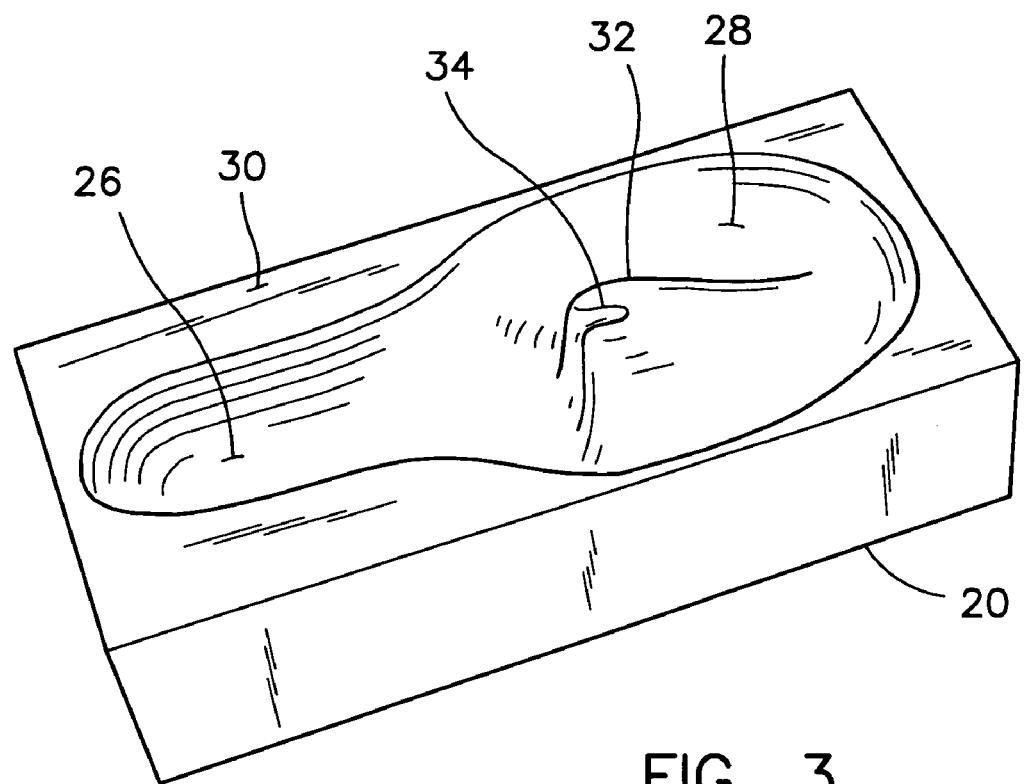
FIG. 3 is a perspective view of a thermoforming mold showing a horn-receiving notch therein.
Figure 4:
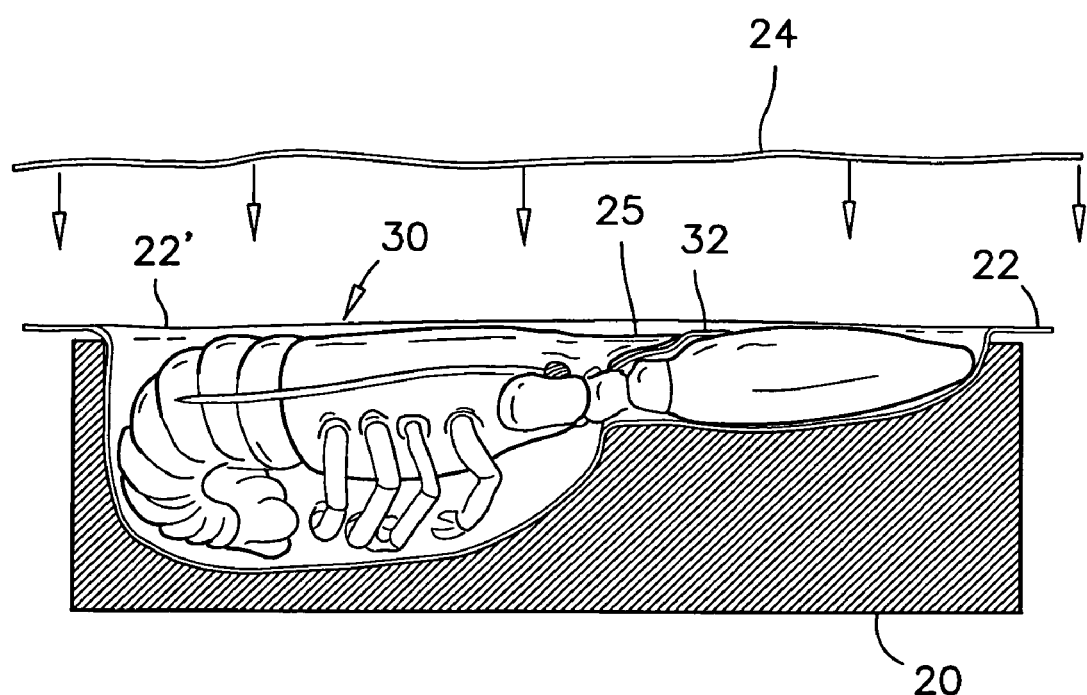
FIG. 4 is a cross-section view of the thermoforming mold, with a tray formed therein, and for illustrative purposes, of a lobster being positioned in the tray.
Figure 5:
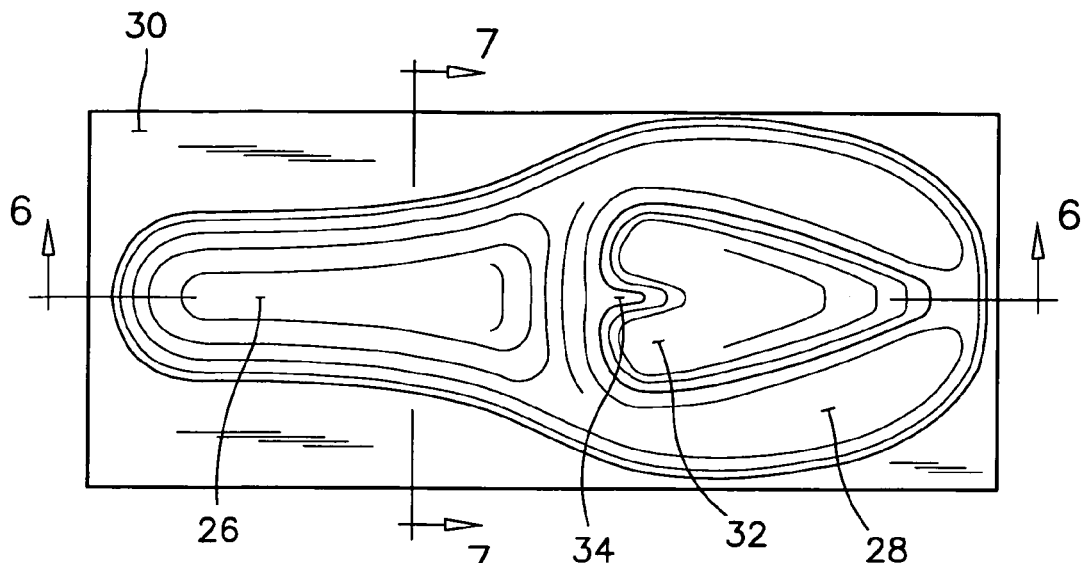
FIGS. 5, 6 and 7 illustrate a top view, and a longitudinal and a transverse cross-section views respectively of the preferred thermoforming mold.
Figure 6:
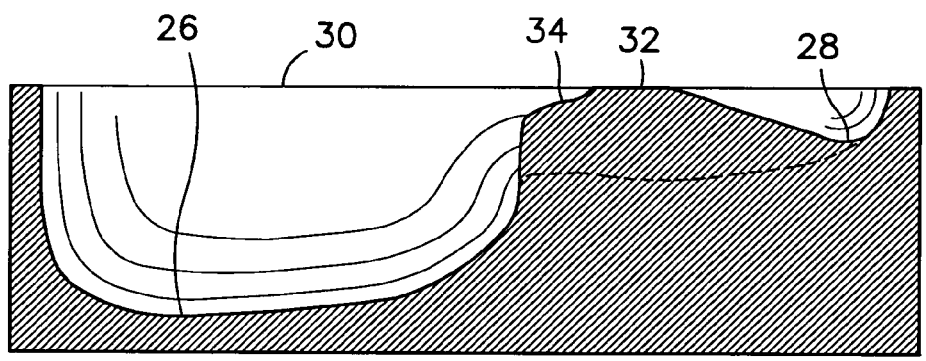
Figure 7:
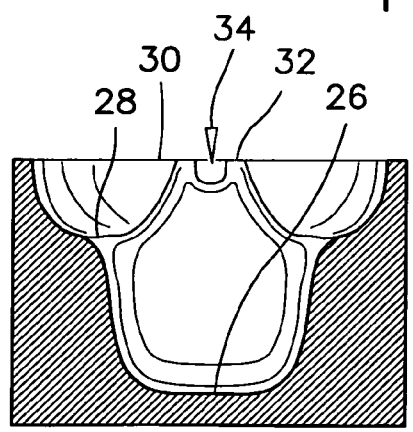

More particularly a mold 20, as illustrated in FIGS. 3-7, is used to preform the bottom sheet 22 into a molded tray 22' which constitutes the bottom half of the finished package. The mold 20 has a lobster body and tail cavity 26, and two claw cavities 28. During a thermoforming process, these cavities are formed into the molded tray 22'. These cavities have respective depths to enclose the respective portions of a lobster completely and to hold the top of the claws and the back of the lobster substantially along a same plane 30 along the top surface of the molded tray 22', as illustrated in FIG. 4.

The mold 20 also has a bulge 32 extending between the claw cavities 28. This bulge 32 extends upward from the mold, and has a top surface aligning with the plane 30. This bulge 32, in the corresponding molded tray 22' prevents the molded tray 22', and the top sheet 24 from pulling upward or downward between the claws of the lobster during a vacuum packaging process.

The bulge 32 has a horn-receiving groove or notch 34 for holding the horn 25 of a lobster therein during a vacuum packaging process. It will be appreciated that the lengths of the lobster tail and body cavity 26 and of the claw cavities 28 are determined to facilitate the automatic positioning of the horn 25 in the notch 34, when a lobster is placed inside the molded tray 22'.

A preferred method for vacuum packaging pre-cooked lobsters consists of;
a) using a thermoforming process and the mold 20, forming a first plastic sheet 22 to cover the bottom surface of the cavities 26, 28 of the mold 20, as illustrated in FIG. 4, thereby forming a molded tray 22';
b) moving the molded tray 22' out of the mold and the thermoforming machine and placing a pre-cooked lobster inside the molded tray 22', with the horn 25 thereof confined in the notch 34;
c) placing a top plastic sheet 24 over the molded tray 22' and the lobster;
d) moving the covered molded tray 22' inside a vacuum packaging machine and making a vacuum between the top plastic sheet 24 and the molded tray 22' thereby enclosing the lobster in a sealed package;
e) trimming the flanges of the package thus formed, and
f) freezing the packaged lobster prior to delivery to a retail outlet.

Figure 8:
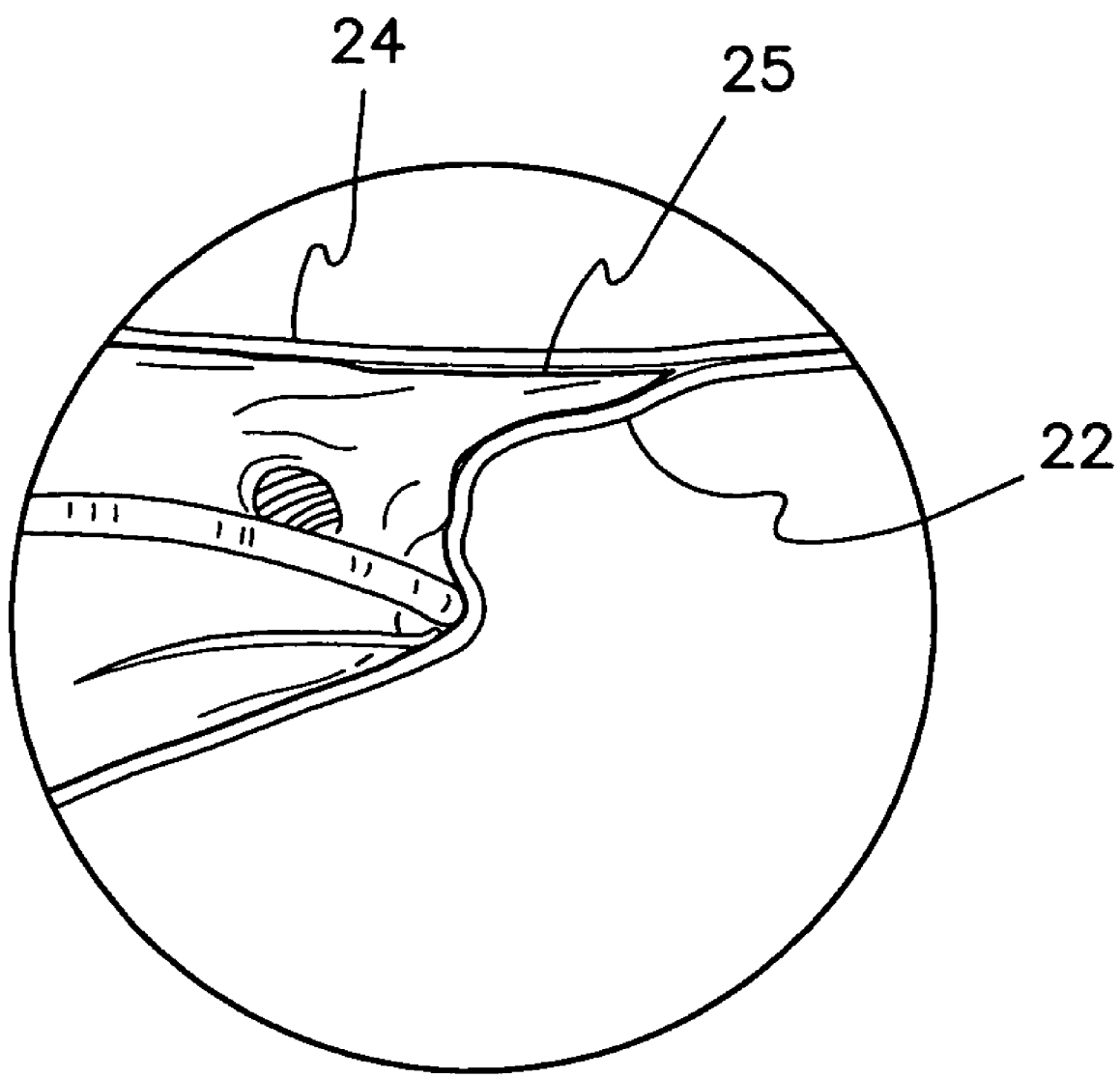
FIG. 8 is a partial view of the packaged according to the preferred embodiment, enclosing the horn of a lobster.

It will be appreciated that during this process, the horn 25 of the lobster and both plastic sheets 22, 24 are held in a fixed relationship relative to each other. More particularly, the horn of the lobster is held with its longitudinal axis substantially parallel to both plastic sheets, as illustrated in FIG. 8, to eliminate the possibility of puncturing either one of the plastic sheets 22,24.

The preferred plastic sheets for vacuum packaging precooked lobsters according to the above method are as follows. The bottom sheet 22 is a roll stock transparent plastic sheet, 9 mils thick, compatible to vacuum packaging requirements. The top sheet 24 is made of a same material as the bottom sheet, but having a thickness of 7 mils.

The lobster packaged according to the above method is clearly visible through the plastic package and has a shelf life of 6 to 9 months.

We claim:

1. A method for vacuum packaging a pre-cooked whole lobster having an intact horn, comprising the steps of
    b) placing a pre-cooked whole lobster with an intact horn inside a plastic tray having a top planar surface;
    c) placing a plastic sealing sheet over said top planar surface of said plastic tray, with a surface region of said plastic sealing sheet in contact with an upper surface of said intact horn; and
    d) vacuum packing said pre-cooked whole lobster in said plastic tray while retaining said intact horn fixed against a surface portion of said plastic tray and pulling said surface region of said plastic sealing sheet toward said surface portion of said plastic tray at a right angle with a longitudinal axis of said intact horn, and enclosing said intact horn between said surface region of said plastic sealing sheet and said surface portion of said plastic tray, with said intact horn pointing between said surface region of said plastic sheet and said surface portion of said plastic tray.

2. The method as claimed in claim 1, wherein said step of retaining said intact horn fixed against a surface portion of said plastic tray comprises the step of retaining said intact horn in a groove in said surface portion of said plastic tray.

3. A method for vacuum packaging a pre-cooked whole lobster having an intact horn, comprising the steps of
    a) providing a plastic tray having a planar top surface, a lobster body and tail cavity and two claw cavities relative to said planar top surface, and a groove in said planar top surface between said claw cavities; said groove having an open end communicating with said lobster body and tail cavity and a shape and length to enclose a lobster horn;
    b) placing a pre-cooked whole lobster with an intact horn inside said plastic tray, with said intact horn nested inside said groove, and with a longitudinal lower surface of said intact horn in contact with a surface portion of said plastic tray inside said groove;
    c) placing a plastic sealing sheet over said planar top surface of said plastic tray with a surface region of said plastic sealing sheet in contact with a longitudinal upper surface of said intact horn; and
    d) vacuum packing said pre-cooked whole lobster in said plastic tray while retaining said intact horn fixed relative to said plastic tray and pulling said surface region of said plastic sealing sheet toward said surface portion of said plastic tray at a right angle with a longitudinal axis of said intact horn, and enclosing said intact horn between said surface region of said plastic sealing sheet and said surface portion of said plastic tray, with said intact horn pointing between said surface region of said plastic sheet and said surface portion of said plastic tray.

\* \* \* \* \*